United States Patent
Foster et al.

(10) Patent No.: US 7,810,622 B2
(45) Date of Patent: Oct. 12, 2010

(54) TRANSMISSION CLUTCHES

(75) Inventors: Michael D. Foster, Carmel, IN (US);
Joel E. Mowatt, Zionsville, IN (US);
Gregory W. Kempf, Avon, IN (US);
James A. Raszkowski, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 839 days.

(21) Appl. No.: 11/060,076

(22) Filed: Feb. 17, 2005

(65) Prior Publication Data

US 2005/0205373 A1    Sep. 22, 2005

Related U.S. Application Data

(60) Provisional application No. 60/555,141, filed on Mar. 22, 2004.

(51) Int. Cl.
*F16D 13/72* (2006.01)

(52) U.S. Cl. .............. 192/48.619; 192/48.8; 192/70.12; 192/85.61; 192/113.34

(58) Field of Classification Search ................. 475/322; 192/48.619, 85.61
See application file for complete search history.

(56) References Cited

U.S. PATENT DOCUMENTS

| | | | | |
|---|---|---|---|---|
| 5,706,694 | A | * | 1/1998 | Bhookmohan et al. ........ 72/325 |
| 5,755,314 | A | * | 5/1998 | Kanda et al. .............. 192/70.12 |
| 5,830,098 | A | | 11/1998 | Kimes ......................... 475/159 |
| 6,029,786 | A | * | 2/2000 | Sommer .................... 192/18 A |
| 6,523,657 | B1 | * | 2/2003 | Kundermann et al. ...... 192/48.8 |
| 2004/0159521 | A1 | * | 8/2004 | Yamamura et al. ........ 192/70.12 |
| 2004/0168874 | A1 | * | 9/2004 | Buck et al. ................. 192/18 A |
| 2005/0026742 | A1 | * | 2/2005 | Tiesler et al. ................ 475/284 |

FOREIGN PATENT DOCUMENTS

| | | |
|---|---|---|
| DE | 4136040 C1 | 1/1993 |
| WO | WO 03/029038 A1 * | 4/2003 |

* cited by examiner

*Primary Examiner*—Richard M. Lorence
(74) *Attorney, Agent, or Firm*—Quinn Law Group, PLLC

(57) ABSTRACT

A transmission includes first and second clutch members rotatable about the same axis. An axial groove is formed in one of the members to distribute lubricating fluid to the other member. Preferably, clutch plates with radial grooves extend between the clutch members. Fluid flows from the axial groove through the radial groove and across faces of the clutch plates to separate the plates during disengagement in order to minimize spin losses.

1 Claim, 4 Drawing Sheets

TRANSMISSION CLUTCHES

CROSS REFERENCE TO RELATED APPLICATONS

This application claims the benefit of U.S. Provisional Application 60/555,141, filed Mar. 22, 2004, which is hereby incorporated by reference in its entirety.

TECHNICAL FIELD

This invention relates to transmission clutches and methods of cooling such clutches.

BACKGROUND OF THE INVENTION

As with clutches in any automatic transmission, cooling fluid is required to remove heat from the pack during apply and release as well as to separate the plates during unapplied conditions. Separation of the clutch plates during unapplied operation is critical to reduce spin losses in the drive unit. To effectively separate the plates utilizing a minimum fluid flow, fluid must be distributed evenly along the length of the clutch and pass radially across the plate interfaces. Reducing the losses within the transmission is critical to help improve the overall efficiency of the hybrid vehicle system.

SUMMARY OF THE INVENTION

A clutch design is provided that enables an efficient method for cooling clutches within a transmission. Accordingly, a transmission within the scope of the invention includes a first clutch member rotatable about an axis and a second clutch member rotatable about the same axis. One or both of the clutch members forms an axial groove for distributing lubricating fluid to the other of the clutch members. The axial groove may be formed by the absence of a spline tooth (i.e., a "missing" spline tooth) in the clutch member. The clutch members may be gear members such as a ring gear, or a rotating clutch housing. The axial groove ensures that fluid is evenly distributed to clutch plates extending between or from the clutch members.

In one aspect of the invention, one of the clutch members has a radial opening therethrough that fluidly communicates with the axial groove to distribute fluid flowing from the axial groove.

In another aspect of the invention, the transmission includes first and second sets of axially-spaced clutch plates including friction plates selectively engageable with alternately spaced reaction plates. The friction plates are splined to the respective first and second clutch members. The friction plates of both the first and second sets of clutch plates have faces formed with radial grooves that fluidly communicate with the axial groove to distribute fluid across the faces and across faces of adjacent reaction plates, thereby minimizing spin losses.

In still another aspect of the invention, the transmission includes a stationary member. The reaction plates of the second set of clutch plates are splined to the stationary member. Thus, the first set of clutch plates are between the first and second clutch members thereby forming a rotating clutch and the second set of clutch plates are between the second rotating clutch member and the stationary member, thereby forming a stationary clutch.

In yet another aspect of the invention, the second clutch member is a ring gear having a clutch hub with a hub shoulder. The radial opening and an axial groove are in the hub shoulder.

A method of cooling a clutch in a transmission includes forming an axial groove in a first rotatable clutch member. After the forming step, lubricating fluid is directed through the axial groove. The second rotatable clutch member is positioned in fluid communication with the axial groove so that the directed fluid flows from the axial groove to the second clutch member.

In one aspect of the invention, the method includes providing a radial opening through at least one of the first and second clutch members. The radial opening is in fluid communication with the axial groove so that fluid directed through the axial groove is distributed through the radial opening to the second clutch member. Thus, fluid which has cooled the first clutch passes through the radial opening and is used to cool the second clutch.

In still another aspect of the invention, the method includes forming radial grooves in axially-spaced clutch plates which extend radially between the first and second clutch members. The radial grooves are in fluid communication with the axial groove. The method may further include lubricating faces of the clutch plates via fluid directed through the axial groove flowing through the radial groove and across the faces, thereby minimizing spin losses within the clutch.

Thus, the clutch members with an axial groove, a radial opening (in at least one of the clutch members) and the friction plates with the radial groove improve fluid flow through clutch plates to minimize spin losses, thereby increasing overall efficiency of the transmission. This structure, and the cooling fluid flow arrangement that it permits is especially beneficial in a hybrid electromechanical transmission. Because the clutch design reuses cooling fluid (i.e., more than one clutch is cooled with the same fluid), a lower volume of cooling fluid is required, and therefore lower spin losses and lower pumping losses may be achieved. The cooling fluid reuse afforded by the clutch design especially serves the fuel economy and efficiency goals of hybrid transmissions.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
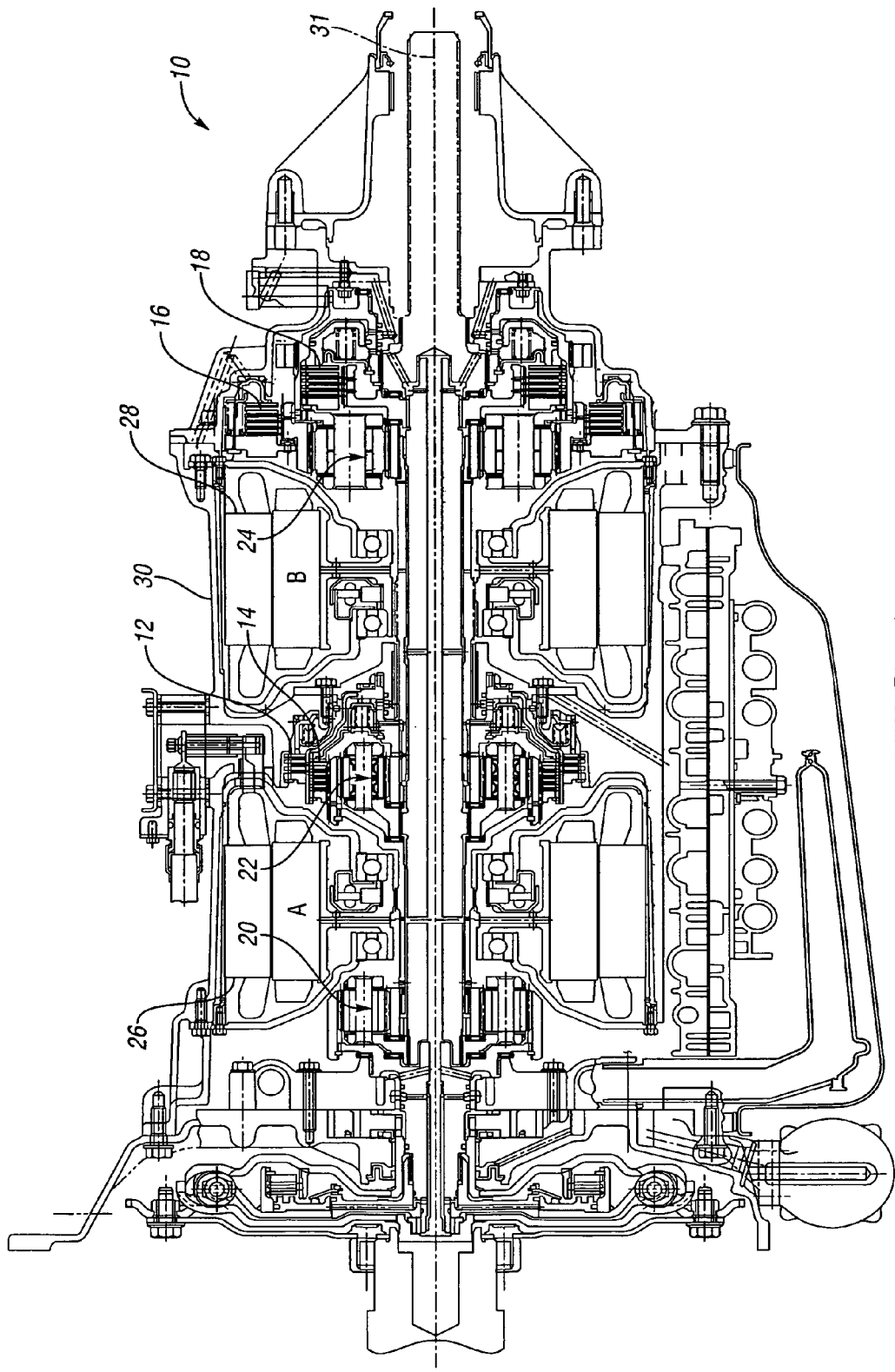
FIG. 1 is a schematic cross-sectional illustration of a hybrid electromechanical transmission.

Referring to the drawings, wherein like reference numbers refer to like components, FIG. 1 illustrates an electromechanical transmission 10 containing four clutches, first clutch 12, second clutch 14, third clutch 16 and fourth clutch 18, that are selectively engageable to achieve various operating modes and fixed ratio ranges by selectively connecting members of the first, second and third planetary gear sets 20, 22, 24, respectively, with one another, with first or second motor/generators 26, 28, respectively, or with a stationary member such as the transmission housing 30. The clutches 12,14,16, and 18, the planetary gear sets 20, 22 and 24 and the motor/generators 26, 28 are all rotatable about a center axis 31.

Figure 2:
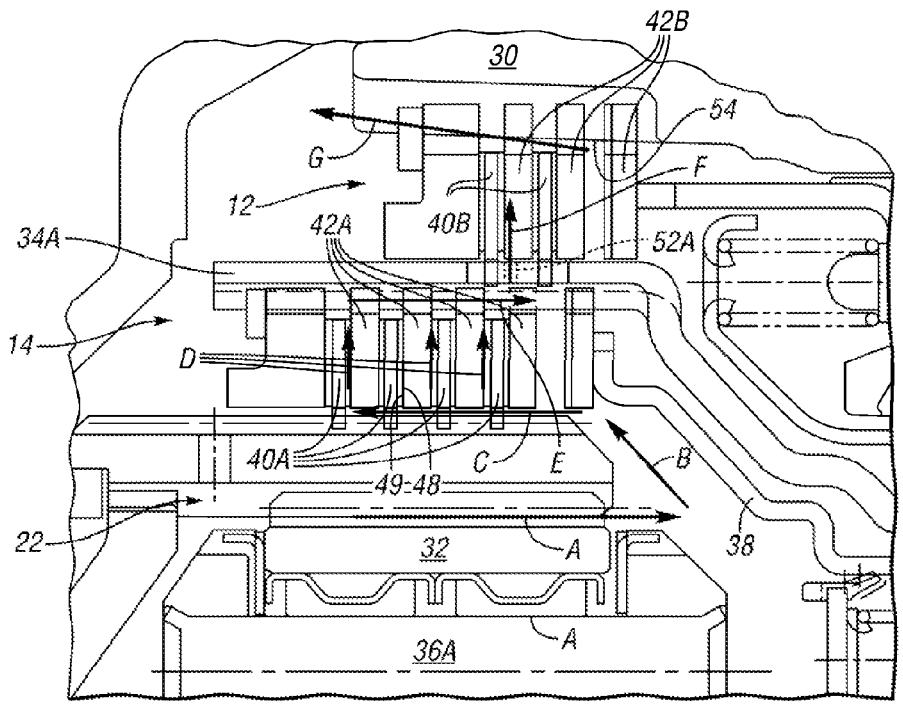
FIG. 2 is a schematic cross-sectional illustration in fragmentary view of a rotating clutch and a stationary clutch within the transmission of FIG. 1.
Figure 5:
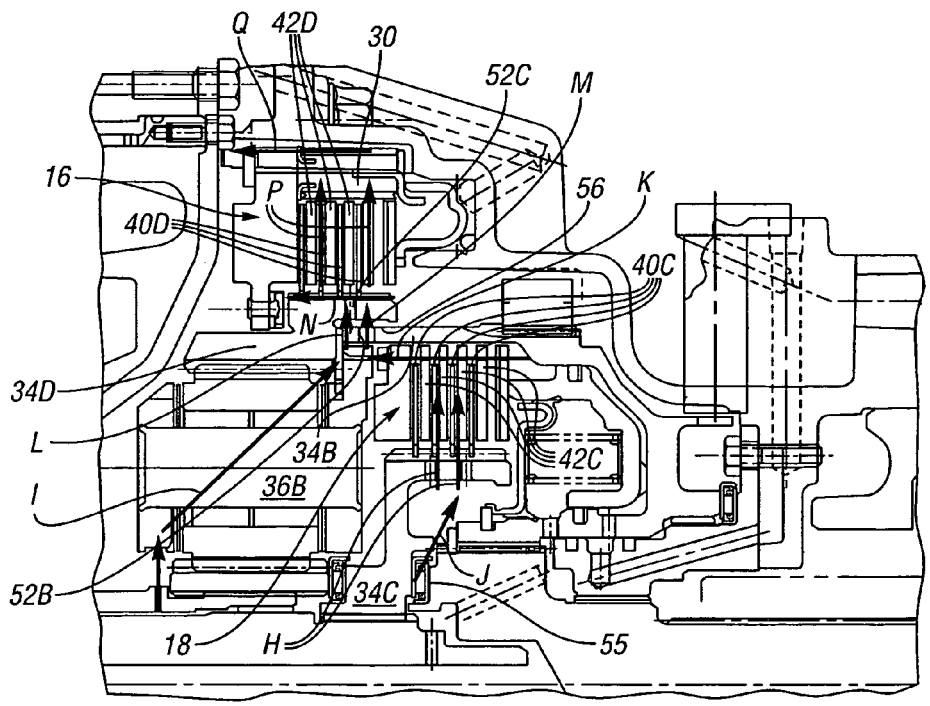
FIG. 5 is a schematic cross-sectional illustration in fragmentary view of another rotating clutch and another stationary clutch within the transmission of FIG. 1.

The clutches are clustered in two pairs; two clutches (first clutch 12 and second clutch 14) are located in the center of the transmission 10 and two clutches (third clutch 16 and fourth clutch 18) are located near the rear. Referring to FIG. 2, the center pair consists of one rotating clutch, second clutch 14, and one stationary clutch, first clutch 12. Both elements or clutch members (ring gear 32 and rotating clutch housing 34A) of the rotating clutch 14 rotate. The rotating clutch 14 is nested within the stationary clutch 12, which shares the rotating clutch housing 34A with the second clutch 14 and has one element or clutch member (the transmission case 30) grounded. The transmission case 30 may be one component or separate components. Referring to FIG. 1, the rear clutch pair 16, 18, also contains one stationary clutch 16 and one rotating clutch 18 slightly offset from each other, as will be discussed in more detail with respect to FIG. 5.

A unique method is utilized for cooling the four clutches 12, 14, 16 and 18 located within the transmission 10. The clutches are nested in two pairs 12, 14 and 16, 18, located near planetary gear sets 22, 24, respectively. This allows for efficient management of lubrication/cooling fluid. Various structural features are implemented to assist in this management. The efficient use and reuse of the fluid results in lower pumping losses for the transmission 10 and better system efficiency.

Figure 3:
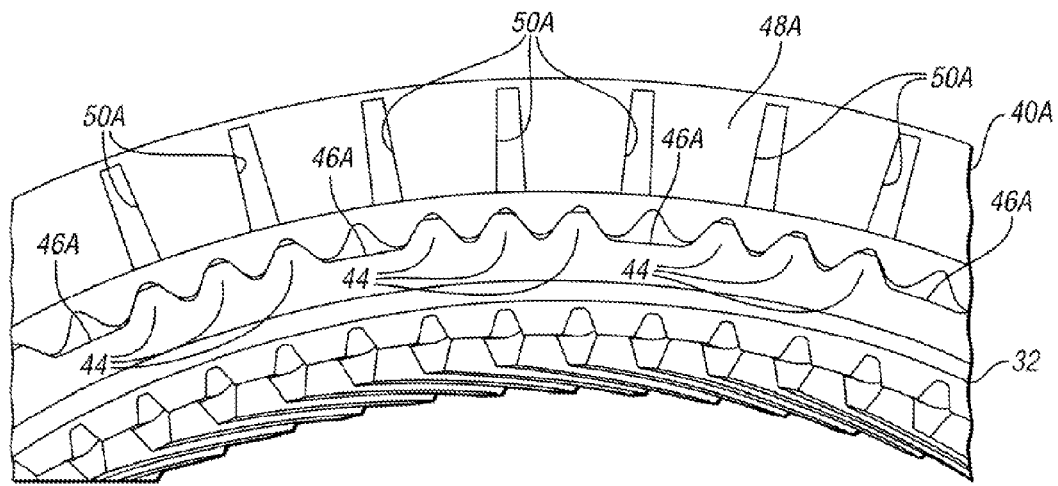
FIG. 3 is a schematic perspective illustration in fragmentary view of a rotating clutch member of the rotating clutch of FIG. 2, illustrating missing spline teeth forming an axial groove and a clutch plate formed with radial grooves.

Referring to FIG. 2, lubrication fluid (denoted by arrow A) exiting carrier assembly 36A of the planetary gear set 22 is directed to the inner diameter of the rotating clutch 14 by the clutch piston 38, as denoted by arrows B and C. Friction plates 40A of the rotating clutch 14 are splined to the ring gear 32. Alternately spaced reaction plates 42A are selectively engageable with the friction plates 40A and are splined to the rotating clutch housing 34A. Together, the friction plates 40A and reaction plates 42A may be referred to as a first set of clutch plates 40A, 42A. As best shown in FIG. 3, to better distribute the cooling fluid along the ring gear 32 to each of the clutch plates 40A, 42A, some of the circumferentially-spaced spline teeth 44 are removed from the ring gear 32 (or the ring gear 32 is formed with "missing" teeth) to create an axial groove 46A in the area of each missing spline tooth. By removing a tooth, an axial groove 46A is formed in the area of the missing tooth.

Figure 4:
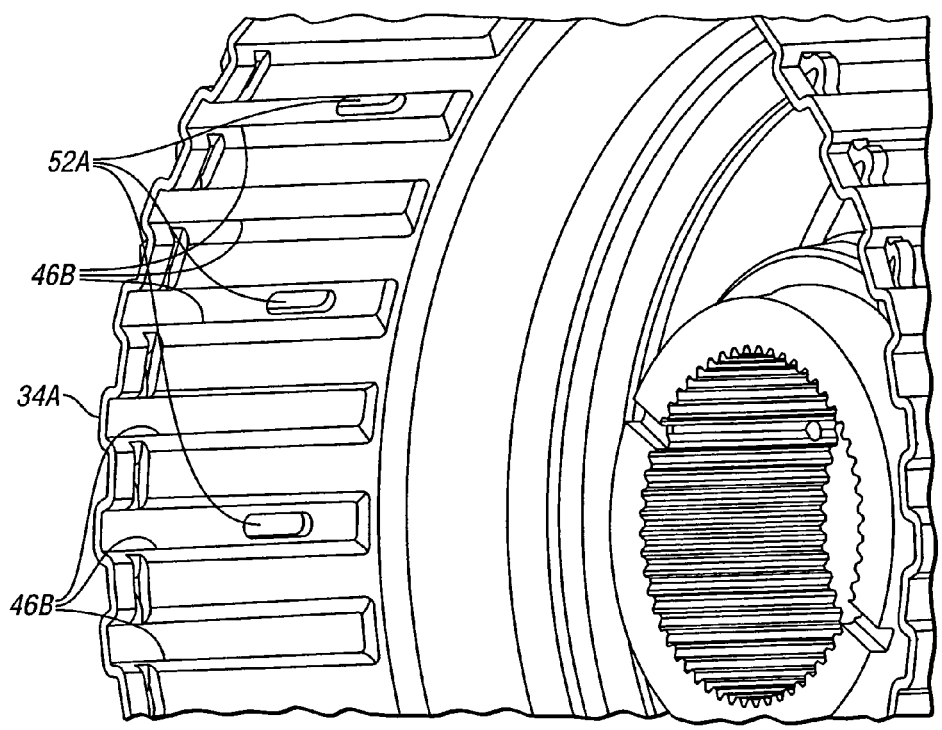
FIG. 4 is a schematic perspective illustration in fragmentary view of a rotating clutch housing of the rotating clutch of FIG. 2 having radial openings.

Referring to FIGS. 2 and 3, as the fluid (denoted by arrow C) passes along the length of the axial grooves 46A of the ring gear 32, it is centrifugally distributed across the face 48A (see FIG. 3) of each friction plate 40A (illustrated by arrows D in FIG. 2). Referring to FIG. 3, radial grooves 50A are formed across the face 48A of each friction plate 40A. The radial grooves 50A act to pump the fluid through the clutch 14 and promote plate separation between the friction plates 40A and reaction plates 42A. As fluid exits the clutch 14 (represented by arrow E in FIG. 2), it is contained by the rotating clutch housing 34A. The fluid (represented by arrow F in FIG. 2) then exits the clutch housing 34A through radial openings or slots 52A formed or machined in the rotating clutch housing 34A (shown best in FIG. 4) which deposit the fluid at the inner diameter of the stationary clutch 12. Referring to FIG. 4, the rotating clutch housing 34A is formed with axial grooves 46B in which the radial openings or slots 52A are formed. Preferably, the stationary clutch friction plates 40B (which extend from the rotating clutch member 34A) also contain radial grooves to direct the fluid through the clutch 12 and maintain plate separation between the friction plates 40B and the alternating reaction plates 42B which extend from the transmission housing 30. After the fluid exits (represented by arrow G) the stationary clutch 12, it returns to a transmission sump (not shown) via drains (not shown) in the transmission housing 30, as is understood by those skilled in the art.

Figure 6:
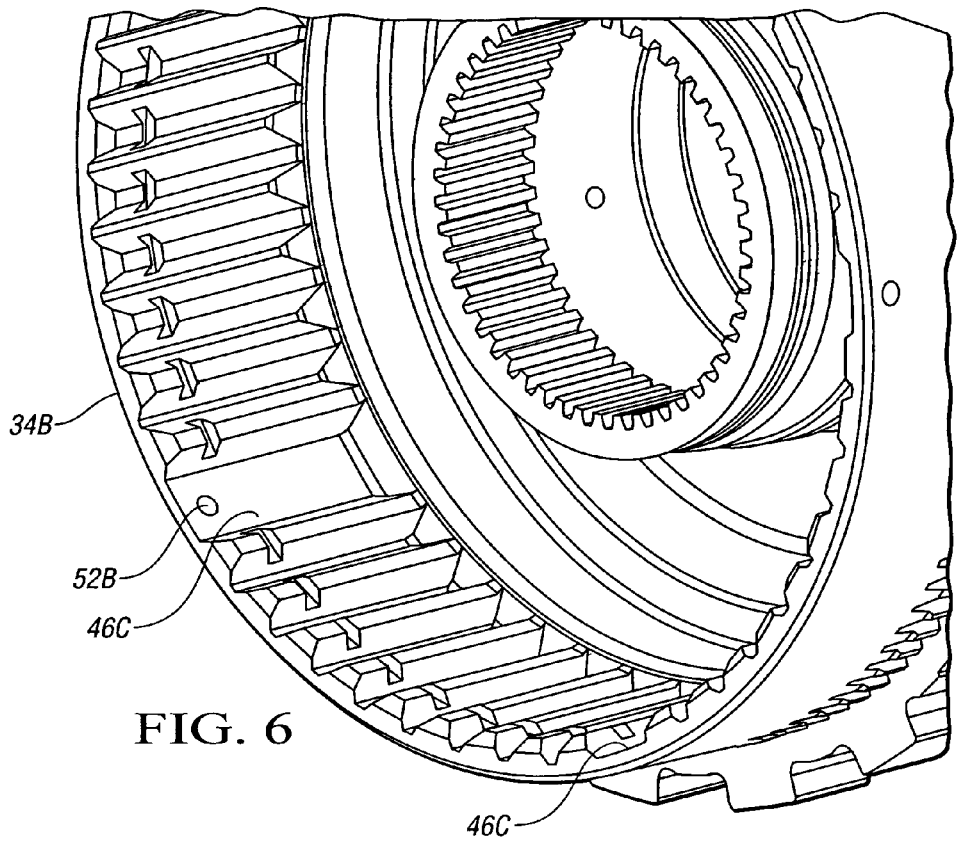
FIG. 6 is a schematic perspective illustration in fragmentary view of a rotating clutch member of the rotating clutch of FIG. 5.

Fluid reuse is also critical to the efficiency in the output section of the transmission 10 and similar unique structural features are incorporated for fluid management. The outer stationary clutch 16 requires higher cooling flow as a result of larger diameter and friction area. As a result, fluid (represented by respective arrows H and I in FIG. 5) exiting both the rotating clutch 18 and the output carrier assembly 36B are combined to cool the stationary cutch 16. Fluid (represented by arrow H) within the hub member 34C flows between reaction plates 42C splined to rotating clutch housing 34B and friction plates 40C splined to hub member 34C. Notably, the fluid H is collected from fluid J flowing radially outward and exiting from passages between other rotating components, such as thrust bearing 55. Fluid (represented by arrow H) exiting the rotating clutch 18 is collected by the rotating clutch housing 34B (collected fluid represented by arrow K) which is formed with gaps between adjacent circumferentially-spaced spline teeth (i.e., has "missing" spline teeth) to form axial grooves 46C (best shown in FIG. 6) that allow the fluid (represented by arrow M) to flow through radial openings 52B in the housing. The fluid I exits the carrier assembly 36B by flowing radially outward between a second rotating clutch member 34D and the rotating clutch housing 34B (exiting fluid represented by arrow L).

Figure 7:
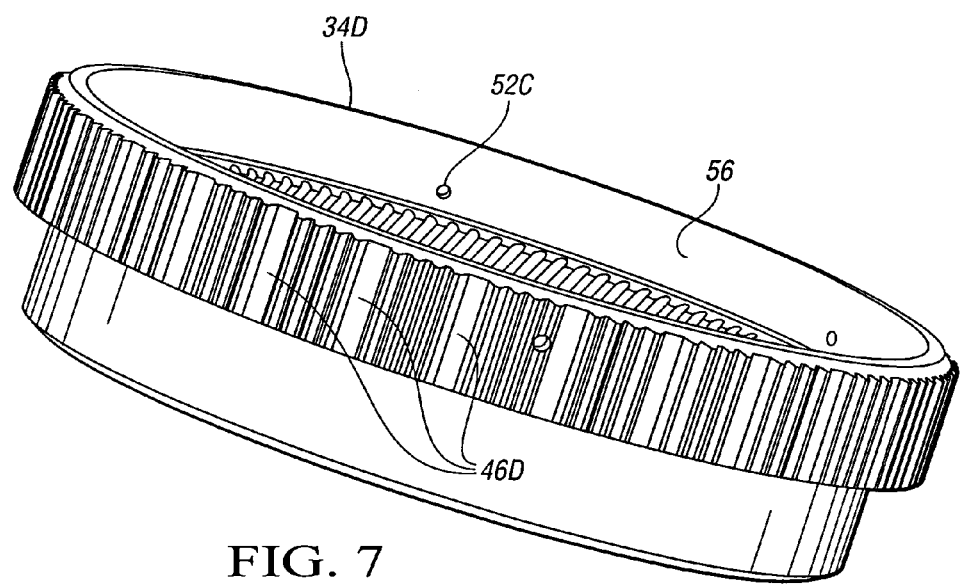
FIG. 7 is a schematic perspective illustration of a rotating clutch member of the stationary clutch of FIG. 5.

Fluid exiting both the clutch housing 34B (fluid M) and the carrier assembly 36B (fluid L) is captured by the second rotating clutch member 34D which is a combination ring gear/clutch hub. Referring to FIG. 7, the second rotating clutch member 34D has a shoulder 56 to contain the fluid and pass it radially (via radial openings 52C (one shown)) to the stationary clutch 16. The clutch hub portion of the second rotating clutch member 34D also contains an interrupted spline (i.e., has spline teeth "removed" or is formed with "missing" spline teeth to form axial grooves 46D in FIG. 7) to allow the fluid (represented by arrow N in FIG. 5) to flow the entire length of the clutch 16. The clutch 16 has friction plates 40D splined to the second rotating clutch member 34D and reaction plates 42D splined to the transmission housing 30 or another stationary member in the transmission 10.

As with the center section clutches 12, 14, the friction plates 40C and 40D in the rear section clutches 16, 18 also contain radial grooves (not shown but similar to grooves 50 of FIG. 3) to efficiently cool and separate the respective sets of clutch plates 40C, 42C and 40D, 42D. Following the exit from the stationary clutch 16, the fluid (represented by arrow Q) returns to the sump via housing drains (not shown).

Thus, a novel method of cooling a clutch in a transmission is presented that is especially beneficial in cooling a pair of adjacent clutches. The method includes forming an axial groove in a first rotatable clutch member and directing lubricating fluid through the axial groove. The fluid may be directed by a combination of centrifugal force and pump pressure from a fluid pump (not shown). A second rotatable clutch member is positioned in fluid communication with the axial groove so that fluid flowing through the axial groove flows to the second clutch member. The fluid communication between the second clutch member and the axial groove may be established by providing a radial opening in the second clutch member. The radial opening may be formed in the second clutch member during casting, or may be subsequently machined. Finally, radial grooves may be formed in adjacent clutch plates, such as in friction plates adjacent to reaction plates within the clutch, and the faces of the adjacent plates may be lubricated by the fluid flowing through the radial groove from the axial groove and the radial opening. By reusing fluid between adjacent clutches and by providing structural features that ensure plate separation during disengagement, the invention provides an efficient clutch cooling system that minimizes inefficiencies due to spin losses and pumping losses associated with higher volumes of cooling fluid.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a first clutch having a first rotatable clutch member rotatable about an axis;
   a second clutch radially-outward of said first clutch and having a second rotatable clutch member rotatable about said axis;
   a first and a second set of axially-spaced clutch plates including friction plates and adjacent reaction plates spaced alternately from and selectively engageable with said friction plates, said second set being radially-outward of said first set;
   wherein one of said first and second clutch members forms an axial groove positioned for collecting cooling fluid exiting the first set of clutch plates and distributing the cooling fluid to the second set of clutch plates, such that the cooling fluid is reused to cool the second set of clutch plates; and wherein said one of said first and second clutch members is characterized by the absence of a spline tooth to form said axial groove.

* * * * *